UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

SOLUBLE BEVERAGE EXTRACT.

1,199,387.  Specification of Letters Patent.  Patented Sept. 26, 1916.

No Drawing.  Application filed October 23, 1915.  Serial No. 57,420.

*To all whom it may concern:*

Be it known that I, JOHN LEONARD KELLOGG, a citizen of the United States, residing in the city of Battle Creek, county of Calhoun, and State of Michigan, have invented a new and useful Improvement in Soluble Beverage Extracts, of which the following is a specification.

My invention relates in general to the manufacture of beverage extracts, quickly soluble in water, from the starch-bearing materials, such as wheat, corn, rye, barley and other cereals, beans, peas, nuts, taro and arrow root. These extracts are intended to be dissolved usually in hot water to be used as a healthful beverage in place of coffee and other beverages considered less healthful.

In one invention made by me, I made a soluble beverage extract in the ordinary way from a mixture of starch-bearing material and malt, the whole being so treated by heat that the starch was converted into maltose and caramelization of the maltose ensued. For the said invention I obtained Letters Patent of the United States dated May 26, 1914, reissued as of date December 15, 1914, No. 13847.

In a still later invention made by me, for which I filed an application for patent on October 14, 1914, Serial No. 866645, which application was allowed on May 13, 1915, I still further improved the process and product described in my said reissued patent, by warming a mixture containing starch-bearing material and malt so as to convert part or all of the starch into maltose, drying and comminuting the mixture, roasting the dried and comminuted product, dissolving out the soluble contents, evaporating the solution and comminuting the product.

The subject of my present application is the product broadly described in my said reissued patent and the specific improvement thereon described and claimed in my said application for patent filed October 14, 1914, Serial No. 866645.

In order that the nature and scope of my invention may be fully understood, I shall first describe in detail one mode in which I now prefer to carry out my invention, and then define in the claims the spirit of the invention and its scope.

In carrying out my invention at present, I prefer to use as the starch-bearing material, a mixture consisting of ten parts bran, five parts wheat flour, five parts corn flour, ten parts rye flour, to which I prefer to add ten parts malt flour and five parts finely ground malt sprouts. In place of the above starch-bearing materials, however, beans, peas, or any starch-bearing tubers may be used, likewise nuts, taro, arrow root and similar substances.

I make a heavy dough of the above ingredients preferably by placing them in an ordinary bakers' mixer and mixing with water until the dough is formed. This dough is then by preference molded into loaves which are placed for efficiency and convenience in a warming oven and maintained at such a high temperature for such a time that the diastatic action of the malt will convert part or all of the starch into maltose.

I at present achieve the best results by keeping the loaves at a temperature of about 140° to 160° F. for about two hours. The loaves are then, by preference, dried, cut into slices, and ground into granular form, the grains being about the size of beans or peas or smaller. This granular compound is then roasted preferably by placing in an ordinary coffee roaster and roasted to a light golden brown, the maltose at the same time becoming caramelized. The soluble contents of the resulting compound are then extracted from the grains, preferably as follows: The roasted grains are placed in a cooker and cooked until all the soluble matter has been extracted. The mass is then placed in a percolator or cooker and hot water poured over the same and drained off repeatedly until all the soluble extract is obtained. This soluble extract is reduced to a granular, or generally speaking, comminuted condition preferably as follows: The soluble extract is evaporated and boiled down to a thick syrup. This syrup is then pumped into a rotary vacuum drier or placed in pans in a vacuum shelf drier and evaporated to dryness. The resulting solid is then ground into the granular form desired.

I find that this method of manufacture is a great improvement over my previous process as the described treatment by heat results in a much more complete conversion of the starchy material in the grains by the diastatic action of the malt.

The flavor and solubility of the product is also greatly improved as previously stated.

It is evident that the above-described composition of the product and the details of the process set forth may be greatly varied without departing from the scope of my invention.

To determine the spirit and scope of my invention reference is to be had to the following claim.

I claim as my invention:

A soluble extract of a cooked and roasted mixture of cereal flour about three parts, bran about two parts, and malt about three parts.

JOHN LEONARD KELLOGG.